Oct. 16, 1945.  H. WILSON  2,386,829
METHOD OF PREPARING PARACHUTES FOR PACKING, STORAGE AND USE
Filed Aug. 10, 1943
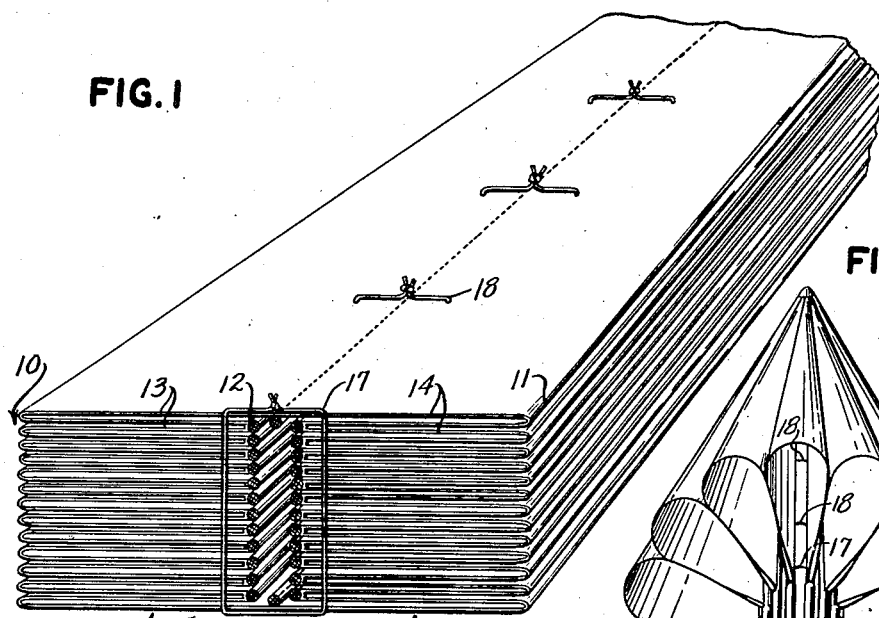
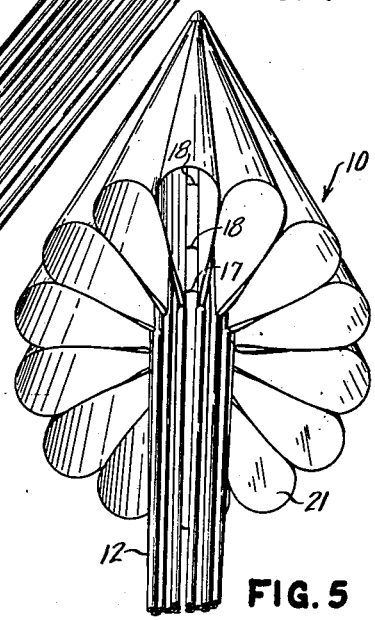
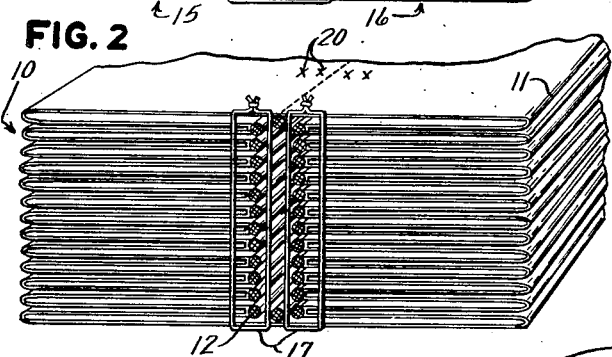
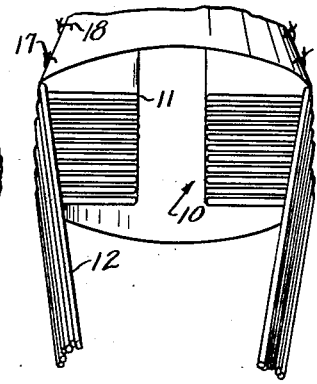
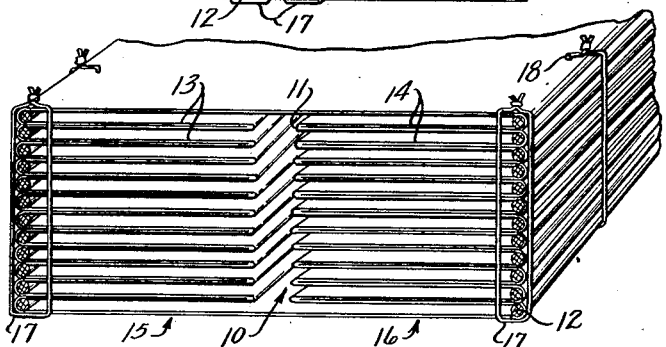
INVENTOR
Harry Wilson
BY
Joseph W. Hazell and
Paul Kontz
ATTORNEYS Patented Oct. 16, 1945

2,386,829

UNITED STATES PATENT OFFICE 2,386,829

METHOD OF PREPARING PARACHUTES FOR PACKING, STORAGE, AND USE

Harry Wilson, Dayton, Ohio

Application August 10, 1943, Serial No. 498,091

12 Claims. (Cl. 244—148)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to the method of preparing parachutes for packing, use, storage, handling, drying and the like.

The primary object of the invention is to provide a method of preparing a parachute for use in a manner whereby the initial inflation forces will be effective centrally of the canopy to bring about a uniform and simultaneous unfolding and expansion of the gores or a rather sudden bursting of the canopy to full inflation and thereby prevent malfunction caused by lateral sailing, inversion, etc., resulting from the peeling off of folds in successive progression.

Another object of the invention is to provide a method of preparing a parachute for use in in a manner whereby the gores are uniformly subjected to the forces of air during opening, thereby to eliminate the danger of ripping caused by subjecting one or more gores to the initial opening forces.

Further objects of the invention are to prevent entanglement of the shroud lines of a parachute and twisting effects upon the gore portions through which shroud lines run, which effects frequently result in the opening of several small lobes, rather than an opening of the entire canopy to its normal projected area.

Still further objects of the invention are to provide a method whereby a parachute may be temporarily retained in at least a semi-folded position whereby it may be readily and conveniently handled, packed for use, suspended for drying, airing and storing without destroying the relationship of the folds of the gores to the extent of requiring an unfurling of the canopy for refolding.

These and other objects of the invention will become apparent from the following specification, appended claims and the accompanying drawing illustrating the application of the method and the operating results thereof during the initial release of the parachute in descent.

Fig. 1 is a perspective view of a section of an accordion folded parachute prepared in accordance with my improved method.

Fig. 2 is a view similar to that of Fig. 1, but illustrating a modified application of the improved method.

Fig. 3 is a view similar to that of Figs. 1 and 2, except for the application of a still further modified application of the improved method.

Fig. 4 is illustrative of the uniform initial inflation of the gores of a parachute prepared for use in accordance with the application of the method illustrated in Figs. 1 and 2.

Fig. 5 is illustrative of the initial inflation of a parachute prepared for use in accordance with the application of the method illustrated in Fig. 3.

The "Wilson stitch" method of preparing a parachute consists of one or more of the following steps, as may be readily understood from the accompanying drawing, namely, of folding the gores 10 of the canopy along a line 11 intermediately of the bounding shroud lines 12 to provide substantially symmetrical, reversely extending, flat folds 13 and 14, as an accordion or bellows, in order to bring the shroud lines 12 into stacks or bunches 15 and 16, one along each edge of the stacks of folds 13 and 14, and then securing the stacks or bunches of lines and folds along the edges bearing the shroud lines by suitable means 17 and 18 in a manner releasable or breakable by the normal forces tending to open a parachute during descent with a normal load. One or more methods of folding the parachute may be employed, for example, Figs. 1 and 2 illustrate the folding of the gores 10 of respective portions of the canopy reversely inward upon themselves in a symmetrical manner to position the shroud lines in adjacent superimposed stacks or bunches centrally of the folded canopy. In Fig. 3, however, the gores 10 of respective portions of the canopy are folded reversely outward upon themselves in a symmetrical manner to position the shroud lines in stacks or bunches along the outer edges of the folded canopy. The stacks or bunches of shroud lines, as well as the folded portions of the gores adjacent the lines, may be suitably secured, for the purposes stated, by passing a thread 17 through the folds adjacent the bunched shroud lines and tying the ends of the thread in a manner to encircle the shroud lines. Each of the two bunches of lines may be secured separately as shown in Figs. 2 and 3, or where the shroud lines are in adjacent stacks, both may be secured by a single loop, as shown in Fig. 1. As an alternative, the stacks of folds may be stitched together at points removed from the shroud lines, such as along the outer edges of the folds, as folded in Figs. 1 and 2, or along the inner edges of the folds, as folded in Fig. 3.

4 ply cotton thread, ticket 12, 8 pound break, has been found of sufficient strength for the tie threads 17. A thread of this weight will permit the handling of the parachute for packing, storage, suspension for airing and drying, etc., without breaking, and yet be of a strength that may be readily broken by forces tending to open the canopy during descent with a normal load.

As shown in Figs. 1, 3, 4 and 5, the folded canopy may be provided with stitches 18, similar to the basic stitches 17, at spaced intervals about similar portions of the folded canopy to insure against disorganization during handling.

As alternatives for stitches 17 and 18, suitable loops or eyelets, whereby the folds may be secured in predetermined relationship, may be employed.

To aid the operator in preparing the parachute in accordance with the method described, the gores may be suitably marked, see reference 20 of Fig. 2, on appropriate sides to indicate the precise spots on each gore through which the thread is to be passed in order that the folds may be secured in predetermined relationship.

In operation, the gores of the parachute prepared as illustrated in Figs. 1 and 2 are initially inflated uniformly into lobes 21, as shown in Fig. 4, and as the forces are increased by a normal load suspended from the parachute, the securing means 17 and 18 give way and the parachute becomes fully extended by evenly distributed, centrally disposed forces, rather than opened in a progressive manner from one side or another, which frequently results in side slipping and inversion.

A parachute prepared as illustrated in Fig. 3 will, upon release from a pack with a normal load, take an initial form substantially as illustrated in Fig. 5. When the outer gores of the folded canopy become inflated, the fold-securing threads are broken by the forces of the enveloped air, and the canopy is expanded from the centralized forces, as in the form of the operation of the method applied in the preparation of the parachute illustrated in Figs. 1 and 2.

Having described my invention and illustrated the manner in which it may be practiced, what I claim is:

1. A method of preparing a parachute for storage, packing, use and the like, which comprises the steps of bunching the shroud lines of the parachute, folding the parachute into panel portions and securing said folds along predetermined lines with spaced severable members disposed at intermediate points the length of said folds in such a manner as to initially restrict opening of said panel portions at said folds only.

2. A method of preparing a parachute for storage, packing, use and the like, which comprises the steps of bunching the shroud lines of the parachute, folding the parachute into panel portions each having an edge adjacent a shroud line, and securing said shroud lines and panel edge portions with severable members spaced along the folded edges thereof in such a manner as to initially restrict opening of said panel portions at said folded edges only.

3. A method of preparing a parachute for storage, packing, use and the like, comprising the steps of bringing at least a portion of each of the shroud lines into substantially parallel relation in bunches, folding the gores of the canopy intermediately of the shroud lines to provide substantially symmetrical, reversely extending flat folds, as an accordion or bellows, and securing the centralized bundles of shroud lines against separation by forces less than those to which a parachute is normally subjected when released from a pack during descent with a normal load said centralized bundles being secured by means provided interiorly of said canopy when folded.

4. A method of preparing a parachute for storage, packing, use and the like, which comprises the bringing of the shroud lines of respective portions of the canopy into adjacent superimposed relationship, folding the gores of the canopy along a center line to provide substantially symmetrical, reversely extending flat folds, as an accordion or bellows, and encircling the centralized stacks of shroud lines with spaced loops of breakable cordage interiorly of said canopy when folded.

5. A method of preparing a parachute for storage, packing, use and the like, comprising the steps of folding the gores of the canopy along a center line reversely outward upon themselves in a symmetrical manner to position the shroud lines in superimposed relation along the outer edges of the folded canopy, and temporarily securing the lines in bunched relation in a manner releasable by the normal forces tending to open a parachute during descent with a normal load.

6. A method of preparing a parachute for storage, packing, use and the like, comprising the steps of folding the gores of the canopy along a center line reversely inward upon themselves in a symmetrical manner to position the shroud lines in adjacent superimposed stacks centrally of the folded canopy, and temporarily securing the lines only in bunched relation within the folded canopy in a manner releasable by the normal forces tending to open a parachute during descent with a normal load.

7. A method of preparing a parachute for storage, packing, use and the like which comprises the steps of folding the parachute into panel portions each panel portion having a fold line adjacent a shroud line, gathering the shroud line so positioned at the edges of the panel portions into bunches and passing breakable tensile members around said bunches and through said panel portions adjacent said fold lines.

8. The method as set forth in claim 7 wherein said breakable tensile members comprise a plurality of said members spaced at intervals along the length of the shroud lines and the edges of said panel portions.

9. A method of preparing a parachute for storage, packing, use and the like which comprises the steps of folding the parachute into panel portions about fold lines containing the shroud lines of the respective panel portions, whereby said shroud lines are disposed in superimposed position and gatherable in bunches adjacent the edges of their respective panel portions, gathering the shroud lines so disposed into bunches and passing breakable tensile members around said bunches and through said panel portions adjacent thereto.

10. The method as set forth in claim 9 wherein said breakable tensile members comprise a plurality of said members spaced at intervals along the length of the shroud lines and the folded edges of said panel portions.

11. The method as set forth in claim 7 wherein said breakable tensile members comprise loops of thread spaced at intervals along the length of the shroud lines and the edges of said panel portions.

12. The method as set forth in claim 9 wherein said breakable tensile members comprise loops of thread spaced at intervals along the length of the shroud lines and the edges of said panel portions.

HARRY WILSON.